United States Patent [19]

Kume et al.

[11] Patent Number: 5,434,780
[45] Date of Patent: Jul. 18, 1995

[54] AUTOMATIC TRANSMISSION CONTROL SYSTEM WITH VARIABLE LOCKUP TIMING

[75] Inventors: Masayuki Kume; Junichi Ishii, both of Katsuta, Japan

[73] Assignees: Hitachi, Ltd.; Hitachi Automotive Engineering Co., Ltd., both of Japan

[21] Appl. No.: 105,120

[22] Filed: Aug. 12, 1993

[30] Foreign Application Priority Data

Sep. 8, 1992 [JP] Japan .................. 4-239825

[51] Int. Cl.$^6$ .......................... B60K 17/02
[52] U.S. Cl. ............... 364/424.1; 364/424.01; 477/120; 477/63; 477/148; 192/3.29; 192/3.3; 192/3.54
[58] Field of Search ........ 364/424.1, 426.04, 424.01, 364/424; 74/866, 867, 868, 865, 864, 869, 733, 732, 857; 192/0.033, 3.54, 3.55, 3.3, 3.31, 3.58, 3.29, 3.28, 0.062, 3.31, 3.29; 180/179, 170; 477/63, 65, 60, 148, 144, 80, 900, 901, 149, 120

[56] References Cited

U.S. PATENT DOCUMENTS

| | | | |
|---|---|---|---|
| 4,393,467 | 7/1983 | Miki et al. | 364/424.1 |
| 4,523,281 | 6/1985 | Noda et al. | 364/424.1 |
| 4,658,676 | 4/1987 | Furusawa et al. | 364/424.1 |
| 4,744,269 | 5/1988 | Greene et al. | 192/3.3 |
| 4,817,473 | 4/1989 | Baltusis et al. | 74/733 |
| 4,819,777 | 4/1989 | Yasue et al. | 192/3.29 |
| 5,048,631 | 9/1991 | Etoh | 180/179 |
| 5,231,897 | 8/1993 | Morita | 364/424.1 |
| 5,267,158 | 11/1993 | Sakaguchi et al. | 364/424.1 |

FOREIGN PATENT DOCUMENTS 2-212668 5/1986 Japan .
63-167161 7/1988 Japan .
61-112852 8/1990 Japan .

*Primary Examiner*—Kevin J. Teska
*Assistant Examiner*—Jacques H. Louis-Jacques
*Attorney, Agent, or Firm*—Evenson, McKeown, Edwards & Lenahan

[57] ABSTRACT

An automatic transmission control system for a transmission which is installed in a vehicle and whose torque converter is provided with a lockup mechanism; comprising a vehicle weight estimation device for estimating the weight of the vehicle; a gradient estimation device for estimating a gradient on which the vehicle is running; a standard lockup line selector for storing therein standard lockup lines which correspond respectively to the specified gear shift ratios of a speed change gear included in the transmission, and for selecting that one of the stored standard lockup lines which corresponds to the gear shift ratio in the present state of the vehicle; a lockup line corrector for correcting the selected standard lockup line in accordance with the estimated vehicle weight and the estimated gradient; and a lockup signal output device for deciding a timing of lockup "ON" or lockup "OFF" by the use of the corrected lockup line, and for delivering a lockup signal to the lockup mechanism (a lockup solenoid) at the decided timing. Since the lockup timing is varied in accordance with a running resistance, the drivability of the vehicle is enhanced.

14 Claims, 20 Drawing Sheets

$$\alpha = (\alpha\theta + \alpha w) \times K_1(VSP, \theta th)$$
$$\beta = (\beta\theta + \beta w) \times K_2(VSP, \theta th)$$

$$\alpha = (\alpha\theta + \alpha w) \times K_3(VSP, \theta th)$$
$$\beta = (\beta\theta + \beta w) \times K_4(VSP, \theta th)$$

AUTOMATIC TRANSMISSION CONTROL SYSTEM WITH VARIABLE LOCKUP TIMING

BACKGROUND OF THE INVENTION

1. Field of the Invention

The present invention relates to an automatic transmission control system for use in vehicles such as automobiles. More particularly, the invention relates to an automatic transmission control system for a transmission which has a speed change gear, a torque converter, and a lockup mechanism for the torque converter.

2. Description of the Related Art

Heretofore, the control of the lockup mechanism of a torque converter in the transmission of a vehicle has been performed by controlling the timings of lockup "ON" and lockup "OFF" on the basis of the speed of the vehicle and the opening of a throttle valve for the engine of the vehicle.

Although not directly pertinent to the controls of the timings of lockup "ON" and lockup "OFF", a technique which changes the engagement force of a lockup clutch in accordance with a running resistance is disclosed in the official gazette of Japanese Patent Application Laid-open No. 212668/1990. Besides, a technique in which a gear shift is effected in accordance with a running resistance or the like is disclosed in the official gazette of Japanese Patent Application Laid-open No. 112852/1986.

The prior-art lockup control stated above has disadvantages as exemplified below. When the vehicle is ascending a slope, the lockup of the lockup mechanism does not turn OFF easily, and the speed change gear of the transmission cannot be downshifted. Moreover, even when the speed change gear has been downshifted, when descending a slope, the lockup does not turn ON easily, and engine braking cannot be applied. That is, with the prior-art lockup control, the timings of the lockup are controlled depending upon only the vehicle speed and the throttle valve opening. Therefore, even in a case where the running resistance of the vehicle has increased in, e.g., the ascent of the slope, the lockup proceeds basically at the same timing as in the running of the vehicle on level ground. This poses the problem that the drivability of the vehicle is not very good.

SUMMARY OF THE INVENTION

The present invention has been made in view of the problem of the prior art as explained above, and it has for its object to provide an automatic transmission control system which can vary the timings of lockup in accordance with the changes of a running resistance, thereby attaining an enhanced drivability.

An automatic transmission control system for accomplishing the object concerns a transmission which has a speed change gear, a torque converter, and a lockup mechanism for the torque converter, and it consists in comprising running resistance grasp means for grasping either of a running resistance or a value of at least one factor which exerts influence on the running resistance; standard lockup line memory means for storing therein a lockup line which corresponds to a condition where the running resistance is standard; lockup line correction means for correcting the lockup line in accordance with either of the running resistance or the value of the influential factor as grasped by the running resistance grasp means; and lockup signal output means for delivering a lockup signal to the lockup mechanism in accordance with the lockup line corrected by the lockup line correction means.

The "running resistance" mentioned here includes, in general, an air resistance, an accelerating resistance, a rolling resistance, a grade resistance, and a combined resistance with all the preceding resistances added up. The running resistance grasp means may grasp all of the above resistances so as to correct the standard lockup line in accordance with these resistances, or it may well grasp only one or more of the above resistances so as to correct the standard lockup line in accordance with only the grasped resistance(s). Alternatively, at least one factor which exerts influence on the running resistance, for example, the weight of a vehicle on which the transmission is installed or a gradient on which the vehicle runs, may be grasped instead of the running resistance itself so as to correct the standard lockup line in accordance with the influential factor (s).

Further, the automatic transmission control system should preferably comprise standard gear shift line memory means for storing therein a gear shift line which corresponds to the condition that the running resistance is standard; gear shift line correction means for correcting the gear shift line in accordance with either of the running resistance or the value of the influential factor as grasped by the running resistance grasp means; and shift signal output means for delivering a shift signal to the speed change gear in accordance with the gear shift line corrected by the gear shift line correction means.

Incidentally, in a case where the speed change gear is a speed change gear of multiple gear shift stages, it is preferable that the standard line memory means stores therein a plurality of standard lines which correspond respectively to the specified gear shift stages, that standard line selection means is further comprised for selecting one standard line corresponding to the gear shift stage in a present state, from among the plurality of standard lines stored in the standard line memory means, and that the correction means corrects the standard line selected by the standard line selection means.

In operation, when the vehicle such as an automobile has come to, for example, a slope which causes it to undergo a change of running resistance, the running resistance or the value of the influential factor (herein, the gradient of the slope) as has changed is grasped by the running resistance grasp means. The correction means corrects the standard line stored in the memory means, in accordance with the grasped running resistance or the grasped influential factor. Using the corrected lockup line, the signal output means delivers the lockup signal to the lockup mechanism. Upon receiving the lockup signal, the lockup mechanism performs lockup "ON" or lockup "OFF".

In this manner, when the running resistance has changed, the standard lockup line is corrected, the lockup signal is output in accordance with the corrected lockup line, and the lockup "ON" or "OFF" is effected. It is therefore possible to enhance the drivability of the vehicle when encountering a change in the running resistance.

PREFERRED EMBODIMENTS OF THE INVENTION

Now, an embodiment of an automatic transmission control system according to the present invention will be described with reference to the accompanying drawings.

Figure 1:
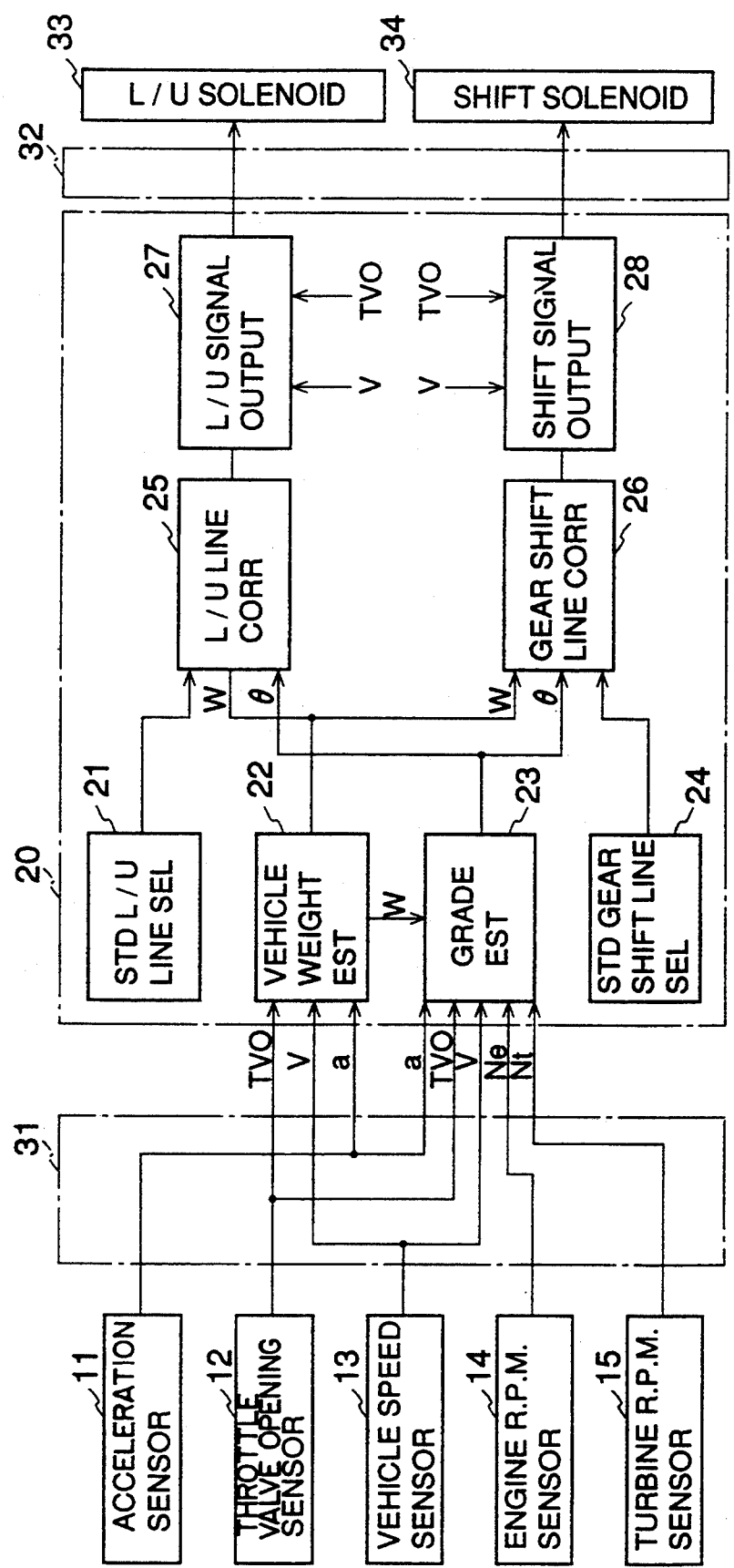
FIG. 1 is a circuit block diagram showing an embodiment of an automatic transmission control system according to the present invention.

As illustrated in FIG. 1, the automatic transmission control system for a transmission in this embodiment is constructed comprising an acceleration sensor 11 which detects the acceleration a of a vehicle such as an automobile, a throttle valve opening (TVO) sensor 12 which detects the opening TVO of a throttle valve for the engine of the vehicle, a vehicle speed sensor 13 which detects the speed V one the vehicle, an engine r.p.m. sensor 14 which detects the r.p.m. or revolution number $N_e$ of the output shaft of the engine, a turbine r.p.m. sensor 15 which detects the r.p.m. or revolution number $N_t$ of a turbine constituting the torque converter of the transmission, a transmission control unit 20 which controls the transmission, an input interface 31 for the transmission control unit 20, and an output interface 32 for the transmission control unit 20. By the way, in this embodiment, the TVO sensor 12 may well be substituted by means for grasping the quantity of fuel injection or means for grasping the quantity of intake air. That is, in this embodiment, the throttle valve opening TVO may well be replaced with the quantity of fuel injection or the quantity of intake air (which has a predetermined relationship with the quantity of fuel injection).

The transmission control unit 20 includes standard lockup line selection means 21 for selecting an appropriate standard lockup line from within a standard lockup line map in accordance with the gear ratio of a speed change gear constituting the transmission in the present state of the vehicle, standard gear shift line selection means 24 for selecting an appropriate standard gear shift line corresponding to the change gear ratio in the present state from within a standard gear shift line map, vehicle weight estimation means 22 for estimating the weight W of the vehicle, gradient estimation means 23 for estimating the gradient $\theta$ of a road on which the vehicle is currently running, lockup line correction means 25 for correcting the selected standard lockup line by the use of the estimated vehicle weight W and the estimated road gradient $\theta$, gear shift line correction means 26 for correcting the selected standard gear shift line by the use of the estimated vehicle weight W and the estimated road gradient $\theta$, lockup signal output means 27 for delivering a lockup signal to a lockup solenoid 33 through the output interface 32 by the use of the corrected lockup line, and shift signal output means 28 for delivering a shift signal to a shift solenoid 34 through the output interface 32 by the use of the corrected gear shift line. Incidentally, the lockup solenoid 33 controls the hydraulic pressure of the driving hydraulic circuit of a lockup mechanism for the torque converter, thereby turning lockup "ON" or "OFF". On the other hand, the shift solenoid 34 controls the hydraulic pressure of the driving hydraulic circuit of the speed change gear, thereby altering the change gear ratio.

Figure 2:
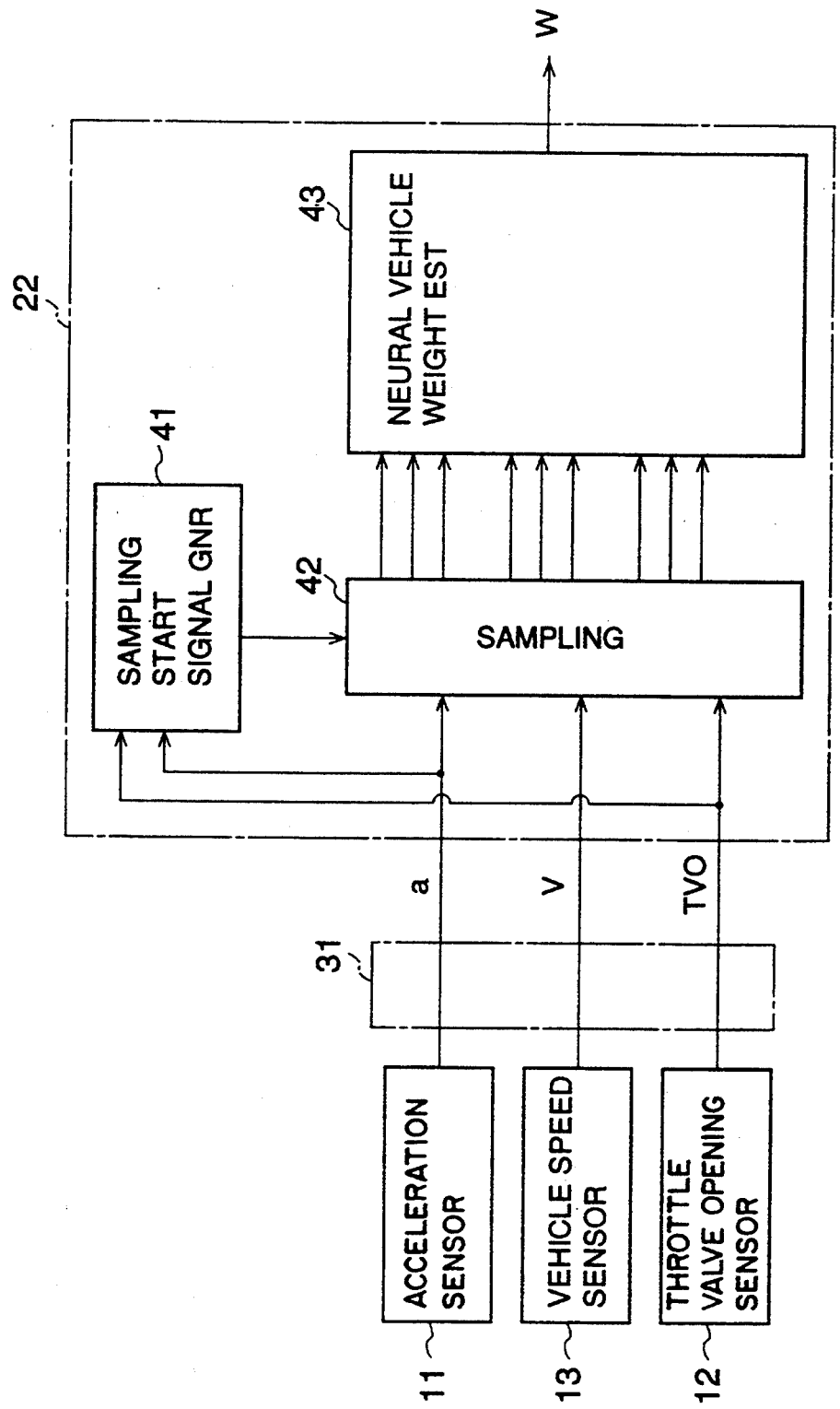
FIG. 2 is a circuit block diagram showing vehicle weight estimation means which is included in the embodiment.

As illustrated in FIG. 2, the vehicle weight estimation means 22 includes a sampling portion 42 which samples the acceleration a, vehicle speed V and throttle valve opening TVO, a sampling start signal generation portion 41 which delivers a sampling start signal to the sampling portion 42; and a neural vehicle weight estimation portion 43 which estimates the vehicle weight W by the use of the sampled acceleration a, vehicle speed V and throttle valve opening TVO.

Figure 3:
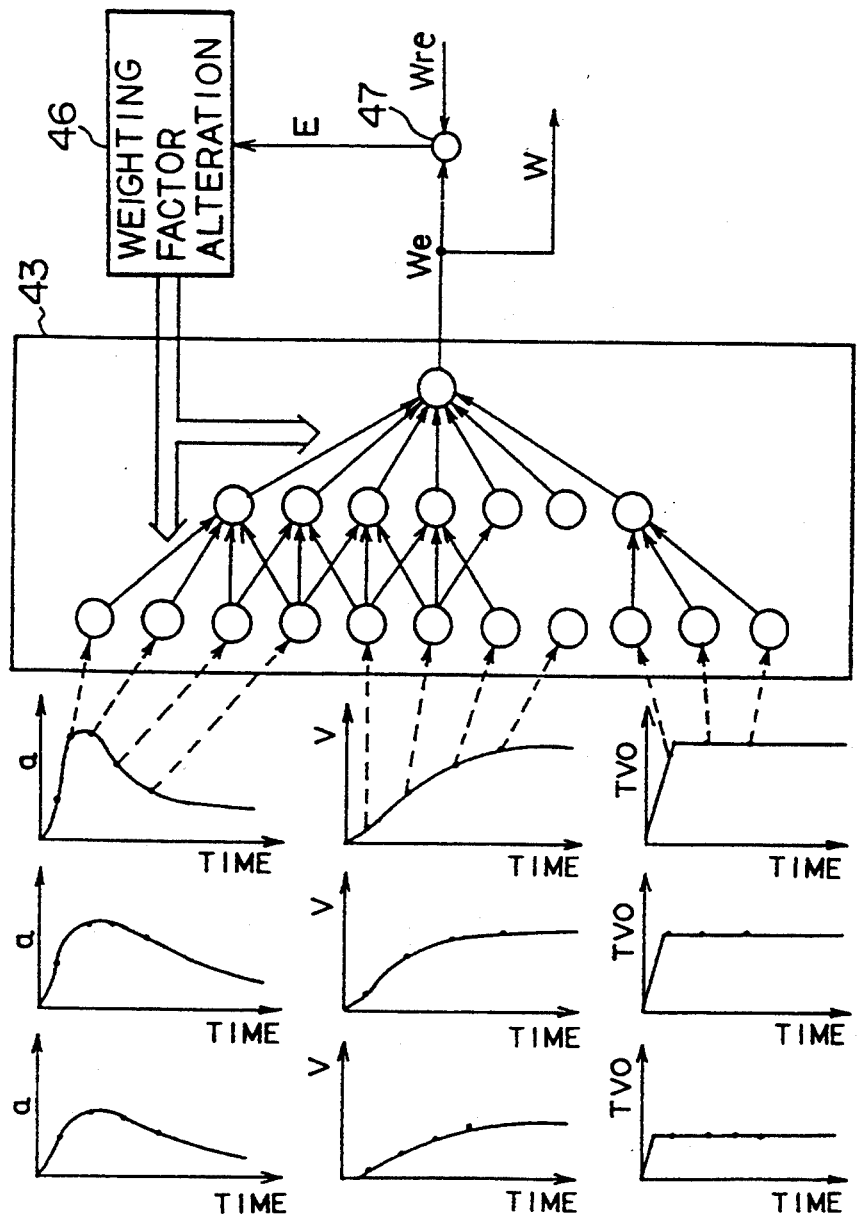
FIG. 3 is an explanatory diagram showing the construction of a neural vehicle weight estimation portion which constitutes the vehicle weight estimation means.

As illustrated in FIG. 3, the neural vehicle weight estimation portion 43 is constructed of a Rumelhart type neural network which consists of the three layers of an input layer, an intermediate layer and an output layer. Each of the layers includes one or more neurons or arithmetic elements, and the neurons of the adjacent layers are coupled by synapses. Signals are transmitted along the input layer→the intermediate layer→the output layer. Each of the synapses is endowed with a weighting factor, and the output signal of the corresponding neuron is multiplied by the weighting factor of the synapse to form the input signal of the next neuron. Each neuron converts the sum of the input signals into the output signal by the use of a sigmoidal function.

The neural network learns the vehicle weight W in such a way that the weighting factors of the respective synapses are so altered as to diminish the error (E) between the real weight ($W_{re}$) of the vehicle and the vehicle weight ($W_e$) estimated from the inputs of the acceleration a, vehicle speed V and throttle valve opening TVO. In order to cope with various aspects of depressing the accelerator pedal of the vehicle, accelerating response waveforms are previously measured by experiments while the values of the vehicle weight and the throttle valve opening are changed for the identical automobile. Subsequently, the time-serial waveforms of the acceleration a, vehicle speed V and throttle valve opening TVO are input to the neural vehicle weight estimation portion 43, and the neural network is caused to deliver the estimated vehicle weight $W_e$. Next, the error E of the estimated vehicle weight $W_e$ with respect to the real vehicle weight $W_{re}$ is calculated by a subtracter 47. Then, a weighting factor alteration portion 46 alters the weighting factors of the synapses so as to diminish the error E. As an algorithm for altering the weighting factors, a back-propagation algorithm is typical, but another algorithm may well be employed. By the way, the alterations of the weighting factors are made basically before the shipping of the vehicle. Therefore, the weighting factor alteration portion 46 and the subtracter 47 may exist before the shipping of the vehicle, and they need not exist after the shipping. It is considered, however, that the estimation portion 43 might fail to accurately estimate the vehicle weight W on account of the secular variations of the outputs of the respective sensors 11, 12 and 13. Therefore, the weighting factor alteration portion 46 and the subtracter 47 may well be kept mounted even after the shipping of the vehicle so as to alter the weighting factors regularly or at need.

Figure 4:
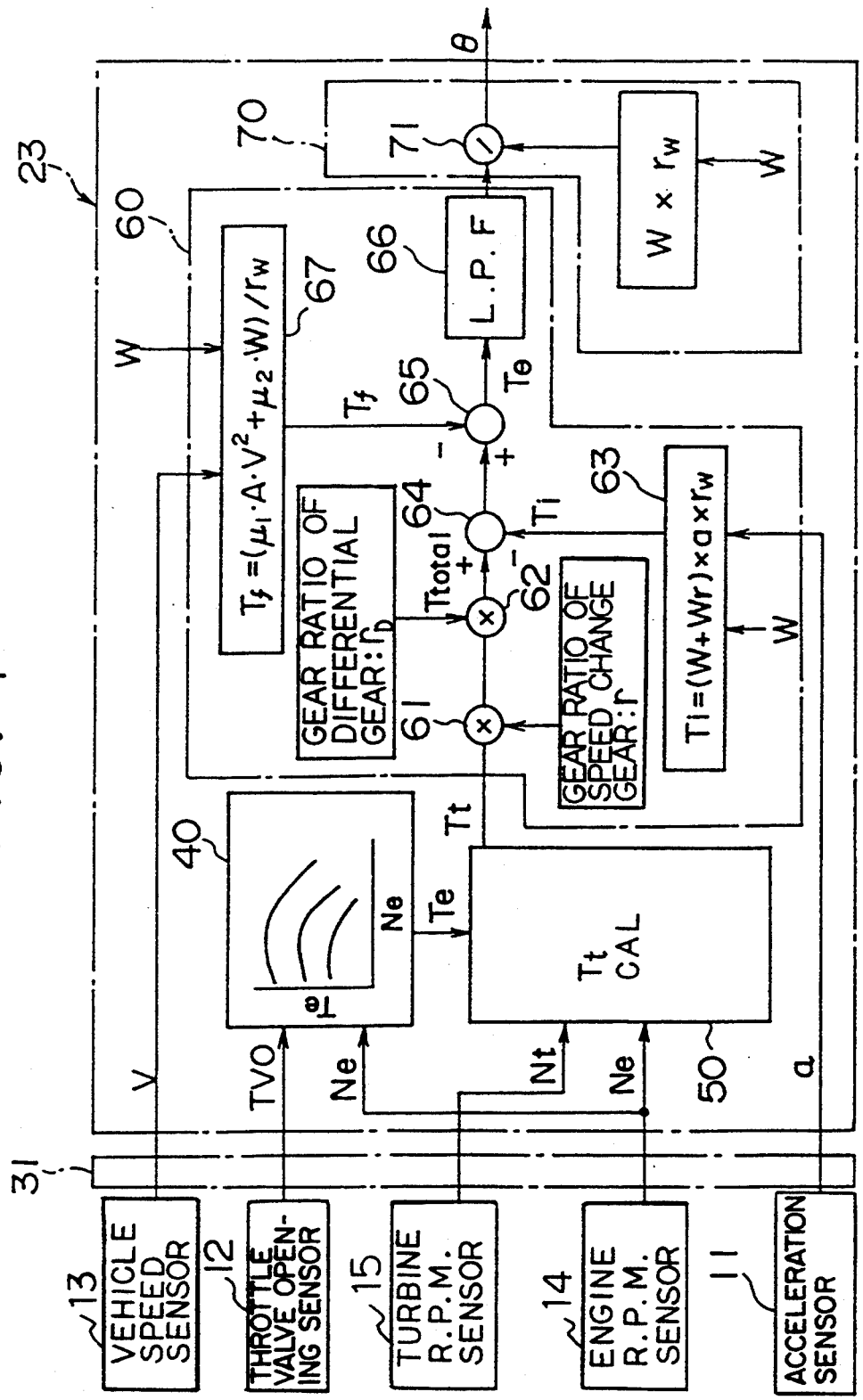
FIG. 4 is a circuit block diagram showing gradient estimation means which is included in the embodiment.

As illustrated in FIG. 4, the gradient estimation means 23 includes an engine torque calculation portion 40 which has the map of engine output characteristics and which evaluates an engine torque $T_e$ corresponding to the measured throttle valve opening TVO and engine revolution number $N_e$ by the use of the engine output characteristics map, a turbine torque calculation portion 50 which evaluates the torque $T_t$ of the turbine constituting the torque converter, a gradient resistance torque calculation portion 60 which evaluates the gradient resistance torque $T_\theta$ of the axle of the vehicle by the use of the evaluated turbine torque $T_t$, and a gradient calculation portion 70 which evaluates the gradient $\theta$ of the road being traveled by the vehicle from the evaluated gradient resistance torque $T_\theta$.

The gradient resistance torque calculation portion 60 is provided with multipliers 61 and 62 which evaluate the total torque $T_{total}$ of the axle in such a way that the turbine torque $T_t$ evaluated by the turbine torque calculation portion 50 is multiplied by the gear ratio r of the speed change gear and the gear ratio $r_D$ of a differential gear constituting the speed change gear, respectively. It is also provided with an accelerating resistance calculation part 63 which evaluates an accelerating resistance torque $T_i$ in such a way that the inertial weight of the vehicle (that is, the vehicle weight W + a weight $W_r$ corresponding to the rotating parts of the vehicle) is multiplied by the detected acceleration a and the effective radius $r_W$ of each tyre of the vehicle. In addition, the gradient resistance torque calculation portion 60 is provided with a subtracter 64 which subtracts the accelerating resistance torque $T_i$ from the total torque $T_{total}$ of the axle, a flatland running resistance torque calculation part 67 which evaluates a flatland (or level ground) running resistance torque $T_f$, a subtracter 65 which evaluates the gradient resistance torque $T_\theta$ in such a way that a difference obtained by subtracting the accelerating resistance torque $T_i$ from the total torque $T_{total}$ has the flatland running resistance torque $T_f$ further subtracted therefrom, and a low-pass filter 66 which removes the high-frequency components of the evaluated grade resistance torque $T_\theta$.

Besides, the gradient calculation portion 70 is provided with a divider 71 which evaluates the gradient $\theta$ in such a way that the gradient resistance torque $T_\theta$ evaluated by the gradient resistance torque calculation portion 60 is divided by the product between the vehicle weight W and the effective radius $r_W$ of the tyre.

Figure 5:
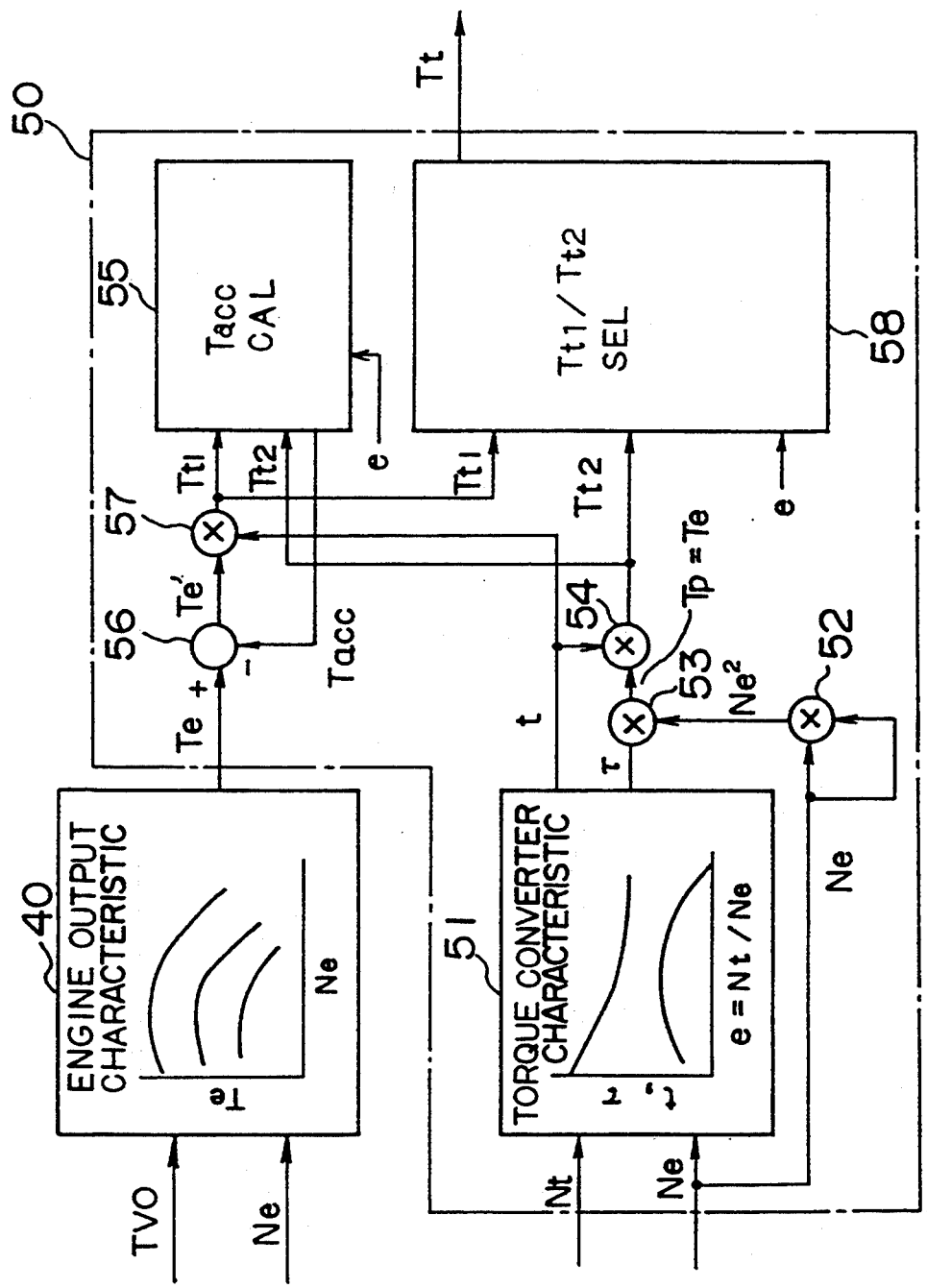
FIG. 5 is a circuit block diagram showing a turbine torque calculation portion which constitutes the gradient estimation means.

As illustrated in FIG. 5, the turbine torque calculation portion 50 is provided with a torque ratio/capacity coefficient calculation part 51 which has the map of torque converter characteristics and which evaluates a capacity coefficient $\tau$ and a torque ratio t corresponding to the detected engine revolution number $N_e$ and turbine revolution number $N_t$ by the use of the torque converter characteristics map. It is also provided with a multiplier 52 which evaluates $N_e^2$ by squaring the detected engine revolution number $N_e$, a multiplier 53 which evaluates an engine torque $T_e$ in such a way that the capacity coefficient $\tau$ evaluated by the torque converter characteristics calculation part 51 is multiplied by the output $N_e^2$ of the multiplier 52, and a multiplier 54 which evaluates a turbine torque $T_{t2}$ in such a way that the engine torque $T_e$ is multiplied by the torque ratio t evaluated by the torque ratio/capacity coefficient calculation part 51. In addition, the turbine torque calculation portion 50 is provided with an accessory torque calculation part 55 which evaluates a torque $T_{acc}$ required for driving the accessories of the vehicle, such as an air conditioner mounted on the automobile. It is also provided with a subtracter 56 which subtracts the accessory torque $T_{acc}$ from the engine torque $T_e$ evaluated by the engine torque calculation portion 40, and a multiplier 57 which evaluates a turbine torque $T_{t1}$ in such a way that an engine torque $T_e'$ obtained by subtracting the accessory torque $T_{acc}$ from the engine torque $T_e$ is multiplied by the torque ratio t. Further, the calculation portion 50 is provided with a turbine torque selection part 58 which selects the more precise one of the turbine torque $T_{t1}$ evaluated using the engine output characteristics and the turbine torque $T_{t2}$ evaluated using the torque converter output characteristics. Incidentally, a pump torque $T_p$ and an r.p.m. ratio e in FIG. 5 will be explained later.

Next, the operation of the automatic transmission control system of this embodiment will be described.

First, the operation of the vehicle weight estimation means 22 will be explained.

When the vehicle weight estimation means 22 is supplied with the acceleration a detected by the acceleration sensor 11, the vehicle speed V detected by the vehicle speed sensor 13 and the throttle valve opening TVO detected by the throttle valve opening sensor 12, the sampling start signal generation portion 41 judges a sampling start timing from the input signals of the acceleration a and the throttle valve opening TVO, and it delivers the sampling start signal to the sampling portion 42.

Figure 8:
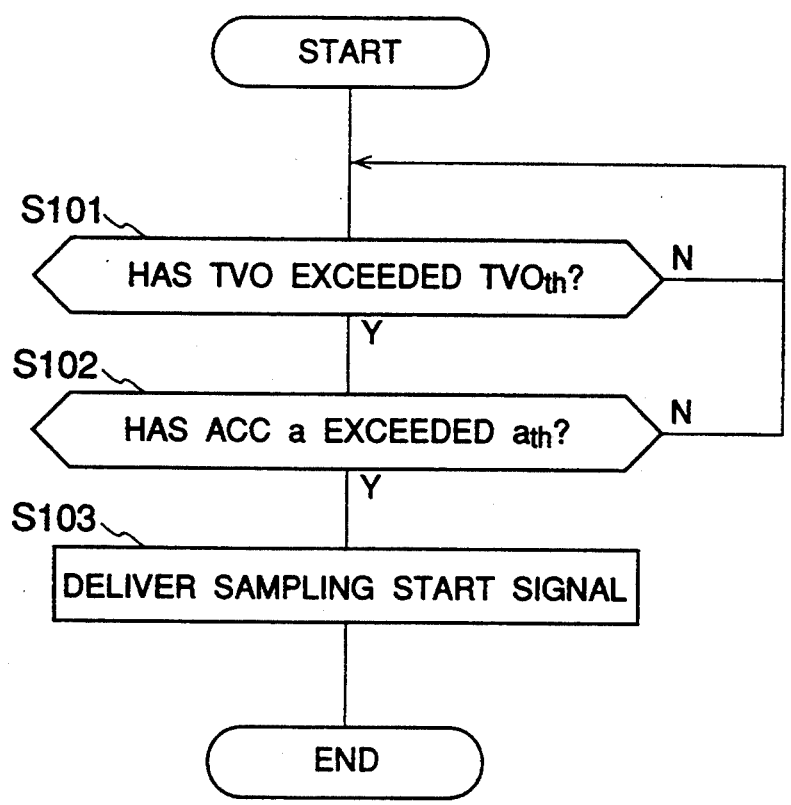
FIG. 8 is a flow chart showing the operation of a sampling start signal generation portion which constitutes the vehicle weight estimation means.

Here, the sampling start signal generation portion 41 operates as illustrated in the flow chart of FIG. 8.

The portion 41 first decides whether or not the throttle valve opening TVO has exceeded a predetermined threshold value $TVO_{th}$ (step 101). When the throttle valve opening TVO has exceeded the threshold value $TVO_{th}$, the routine proceeds to a step 102, and when not, the routine returns to the step 101 again. At the step 102, the generation portion 41 decides whether or not the acceleration a has exceeded a predetermined threshold value $a_{th}$. When the acceleration a has exceeded the threshold value $a_{th}$, the routine proceeds to a step 103, and when not, the routine returns to the step 101 again. At the step 103, the sampling start signal is delivered to the sampling portion 42.

Figure 6A:
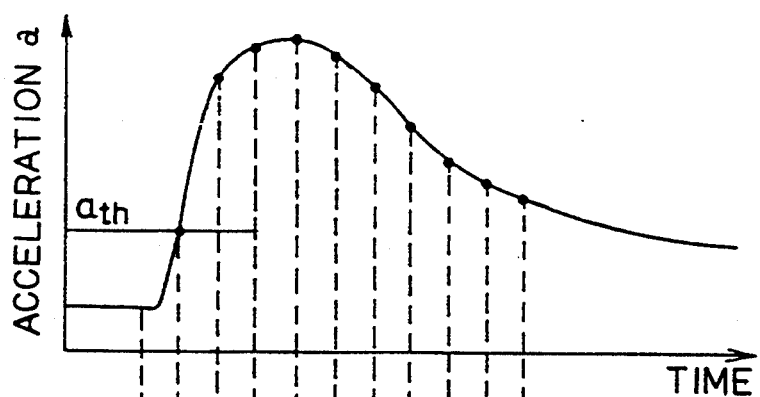
FIGS. 6A, 6B and 6C are explanatory diagrams showing the sampling timings of the vehicle weight estimation means.
Figure 6B:
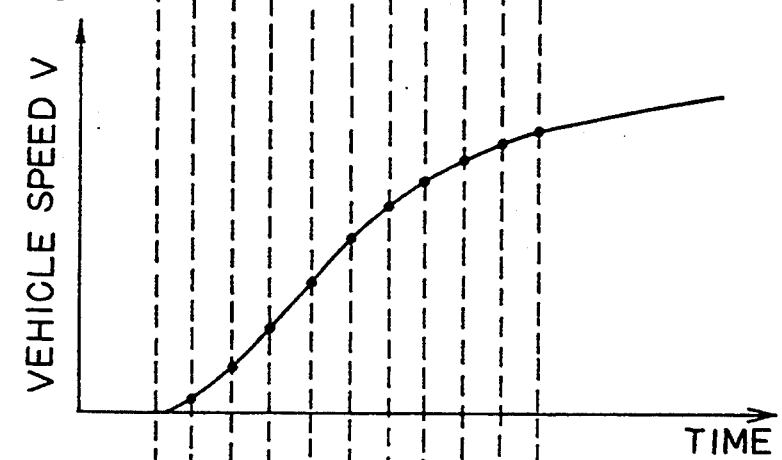
Figure 6C:
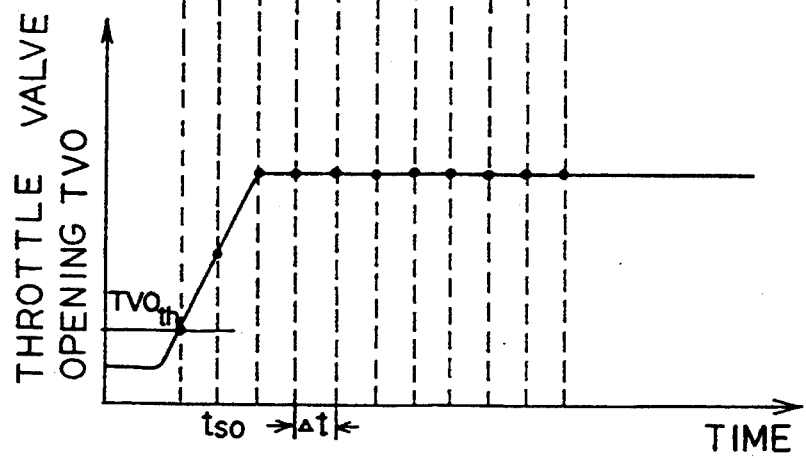

As illustrated FIGS. 6A, 6B and 6C respectively, the sampling portion 42 begins to sample the acceleration a, vehicle speed V and throttle valve opening TVO at predetermined sampling intervals $\Delta t$ when it has received the sampling start signal from the generation portion 41, in other words, at a point of time $t_{so}$ at which both the threshold values $TVO_{th}$ and $a_{th}$ have already been exceeded.

In this manner, the sampling is started when the throttle valve opening TVO and the acceleration a have exceeded the predetermined threshold values $TVO_{th}$ and $a_{th}$, respectively. The reason therefor lies in the neural network which is so constructed that the neural vehicle weight estimation portion 43 estimates the vehicle weight W by the use of several signals developed when the vehicle is in such a condition that the accelerator pedal has been depressed to accelerate the vehicle.

Figure 7A:
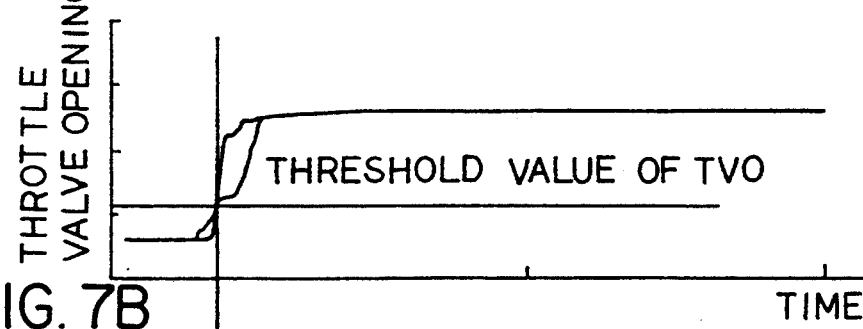
FIGS. 7A and 7B are explanatory diagrams showing the relationship between the variation of a throttle valve opening and that of an acceleration.
Figure 7B:
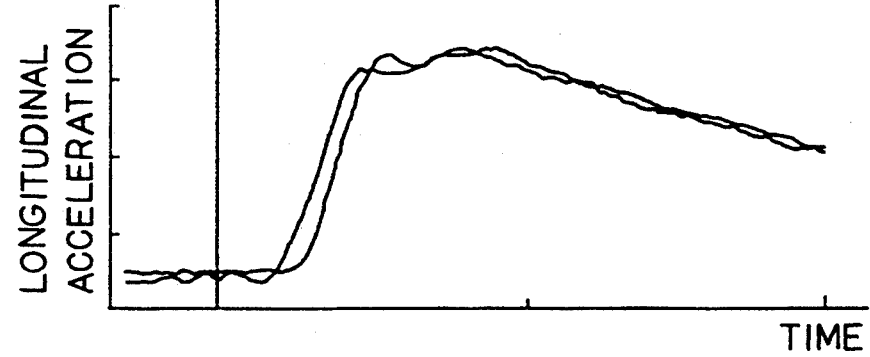

The reason will be explained in more detail. It is inappropriate to deliver the sampling start signal on the basis of the fact that only the throttle valve opening TVO has exceeded its threshold value. As illustrated in FIG. 7A, the variation of the throttle valve opening TVO differs because of an individual difference involved in the way the driver of the vehicle depresses the accelerator pedal. Accordingly, the rise of the acceleration a (the longitudinal acceleration in the longitudinal direction of the body of the automobile) becomes discrepant as illustrated in FIG. 7B. It is therefore unfavorable to judge the sampling start timing from only the threshold value of the throttle valve opening TVO. On the other hand, it is inappropriate to deliver the sampling start signal when only the acceleration a has exceeded its threshold value. The vehicle can be accelerated without depressing the accelerator pedal as in, for example, a case where the vehicle is running on a downward slope. It is therefore unfavorable to judge the sampling start timing from only the threshold value of the acceleration a in this embodiment in which the vehicle weight W is estimated in relation to the throttle valve opening TVO.

In the neural vehicle weight estimation portion 43, the signals of the vehicle speed V, acceleration a and throttle valve opening TVO sampled by the sampling portion 42 enter the input layer as shown in FIG. 3, and the vehicle weight W is thereafter estimated via the intermediate and output layers. As stated before, in the neural vehicle weight estimation portion 43, the synapses are weighted in advance so as to diminish the error E between the estimated vehicle weight $W_e$ and the real vehicle weight $W_{re}$. Therefore, the vehicle weight W delivered from the output layer of the estimation portion 43 has almost no deviation from the actual vehicle weight.

Thus, the vehicle weight grasping method in this embodiment is a method which recognizes the vehicle weight by utilizing the fact that the responses of the acceleration a and the vehicle speed V, which arise when the driver of the automobile depresses the accelerator pedal, differ depending upon the vehicle weight. Alternatively, the vehicle weight may well be grasped by the use of a sensor for measuring the vehicle weight. This measure, however, leads to a higher cost because the vehicle weight measuring sensor needs to be mounted on each vehicle unlike the above method which grasps the vehicle weight W in software fashion.

Next, the operation of the gradient estimation means 23 will be explained.

In estimating the gradient $\theta$ of the road, a gradient resistance $F_\theta$ (or the gradient resistance torque $T_\theta$) first needs to be evaluated.

In general, the total running resistance $F_{total}$ of the vehicle differs depending upon the situation of the road, the states of the tyres, etc., and it can be expressed by the sum of a rolling resistance $F_r$, an air resistance $F_a$, the gradient resistance $F_\theta$ which acts on the vehicle when the vehicle ascends a slope by way of example, and an accelerating resistance $F_i$ which acts on the vehicle when the vehicle is being accelerated. That is, the total running resistance $F_{total}$ can be expressed as indicated by Eq. 1:

$$F_{total}=F_r+F_a+F_\theta+F_i \qquad (Eq.\ 1)$$

It is accordingly necessary for the evaluation of the gradient resistance $F_\theta$ to subtract the rolling resistance $F_r$, air resistance $F_a$ and accelerating resistance $F_i$ from the total running resistance $F_{total}$ as indicated by Eq. 2:

$$F_\theta=F_{total}-F_r-F_a-F_i \qquad (Eq.\ 2)$$

In this embodiment, therefore, the gradient resistance torque $T_\theta$ is evaluated (as illustrated in FIG. 4) by multiplying the turbine torque $T_t$ calculated by the turbine torque calculation portion 50 by the gear ratios r and $r_D$, thereby obtaining the combined resistance torque $T_{total}$ of the axle, and then the accelerating resistance torque $T_i$ and the flatland running resistance torque $T_f$ (=an air resistance torque+a rolling resistance torque) are subtracted from the combined resistance torque $T_{total}$.

In more detail, the gradient estimation means 23 operates as stated below.

Figure 9:
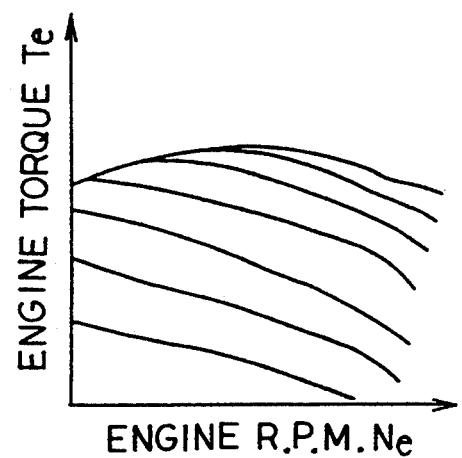
FIG. 9 is a graph showing engine output characteristics.

When supplied with the detected throttle valve opening TVO and engine r.p.m. $N_e$, the engine torque calculation portion 40 evaluates the engine torque $T_e$ corresponding to the received throttle valve opening TVO and engine r.p.m. $N_e$ by the use of the engine output characteristics map in which, as shown in FIG. 9, the engine torque $T_e$ versus the engine r.p.m. $N_e$ is expressed with the throttle valve opening TVO set as a parameter.

Figure 10:
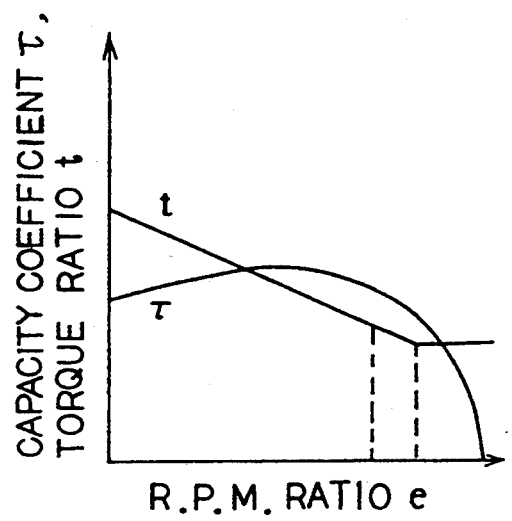
FIG. 10 is a graph showing torque converter characteristics.
Figure 12:
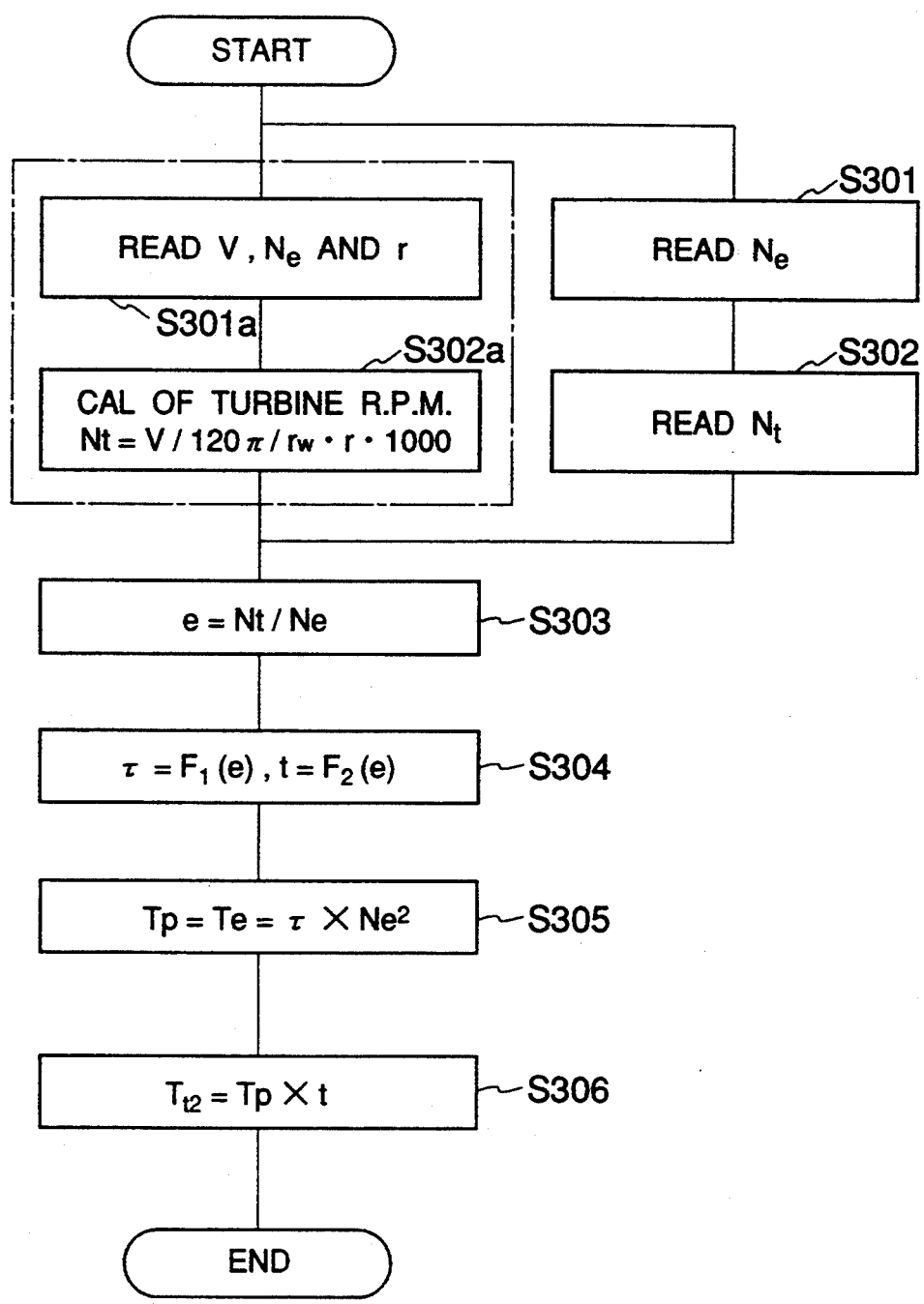
FIG. 12 is a flow chart showing steps for evaluating a turbine torque ($T_{t2}$) in another example.

As illustrated in the flow chart of FIG. 12, in the turbine torque calculation portion 50, the torque ratio/capacity coefficient calculation part 51 is supplied with the detected turbine r.p.m. $N_t$ and engine r.p.m. $N_e$ (steps 301 and 302). Then, it evaluates the r.p.m. ratio e (step 303). Subsequently, it evaluates the capacity coefficient $\tau$ and torque ratio t of the torque converter corresponding to the evaluated r.p.m. ratio e, by the use of the torque converter characteristics map as shown in FIG. 10 (step 304).

The engine torque $T_e$ (=pump torque $T_p$) can be expressed by Eq. 3:

$$T_e = \tau \times Ne^2 \qquad (Eq.\ 3)$$

In the multiplier 53, therefore, the term $Ne^2$ evaluated by the multiplier 52 is multiplied by the capacity coefficient $\tau$, whereby the engine torque $T_e$ is obtained (step 305). Further, in the multiplier 54, the obtained engine torque $T_e$ is multiplied by the torque ratio t evaluated by the torque ratio/capacity coefficient calculation part 51, whereby the turbine torque $T_{t2}$ is obtained (step 306).

By the way, in the absence of the turbine r.p.m. sensor 15, the steps 301 and 302 in the series of processing steps for evaluating the turbine torque $T_{t2}$ may well be replaced with a step 301a at which the vehicle speed V, engine r.p.m. $N_e$ and gear ratio r are received, and a step 302a at which the turbine r.p.m. $N_t$ is evaluated from the vehicle speed V and the effective radius $r_w$ of each tyre.

In this embodiment, not only the torque converter characteristics are utilized for evaluating the turbine torque $T_{t2}$ as thus far explained, but also the engine output characteristics stated before are utilized for evaluating the turbine torque $T_{t1}$ in order to accurately grasp the turbine torque $T_t$.

Figure 11:
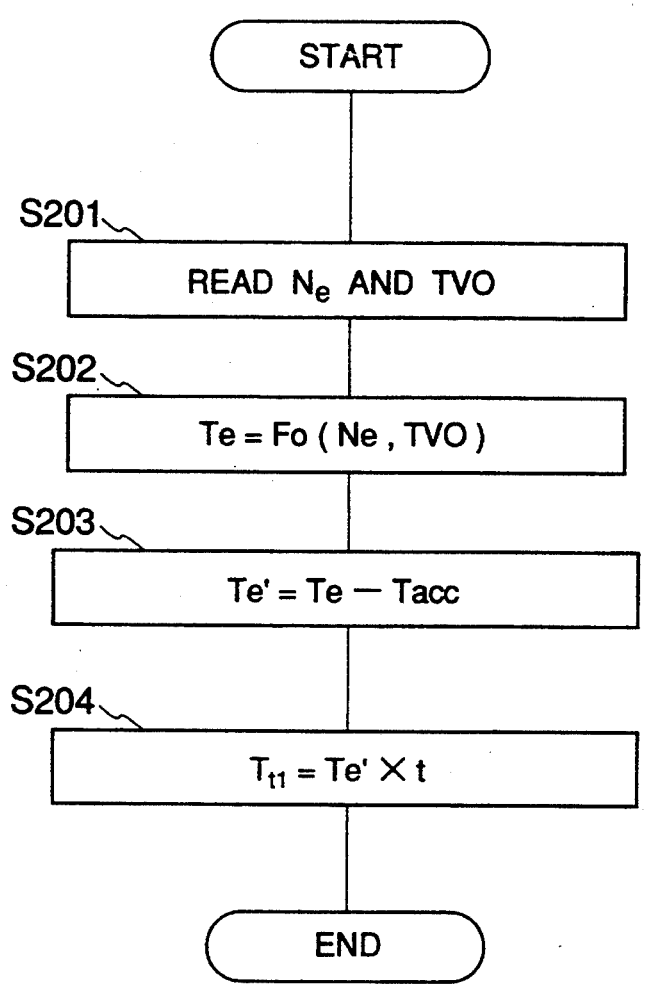
FIG. 11 is a flow chart showing steps for evaluating a turbine torque ($T_{t1}$) in an example.

The turbine torque $T_{t1}$ is evaluated as illustrated in the flow chart of FIG. 11. More specifically, in the engine torque calculation portion 40, the engine torque $T_e$ is evaluated by the processing explained before (steps 201 and 202). Thereafter, the accessory torque $T_{acc}$ is subtracted from the evaluated engine torque $T_e$ in the subtracter 56 (step 203). Finally, the resulting engine torque $T_e'$ is multiplied by the torque ratio t in the multiplier 57 (step 204). Here, the subtraction of the accessory torque $T_{acc}$ from the engine torque $T_e$ is done for the following reason: The component of the accessory torque $T_{acc}$ is naturally contained in the engine torque $T_e$ evaluated using the engine output characteristics. Therefore, when the engine torque $T_e$ is directly multiplied by the torque ratio t, the decremental component ascribable to the accessories mounted in the vehicle is contained in the turbine torque to-be-obtained. By the way, in the case where the turbine torque $T_{t2}$ is evaluated using the torque converter characteristics, the decremental component ascribable to the mounted accessories is taken into consideration because the turbine r.p.m. $N_t$ is utilized.

The accessory torque $T_{acc}$ is evaluated as explained below by the accessory torque calculation part 55.

Figure 13:
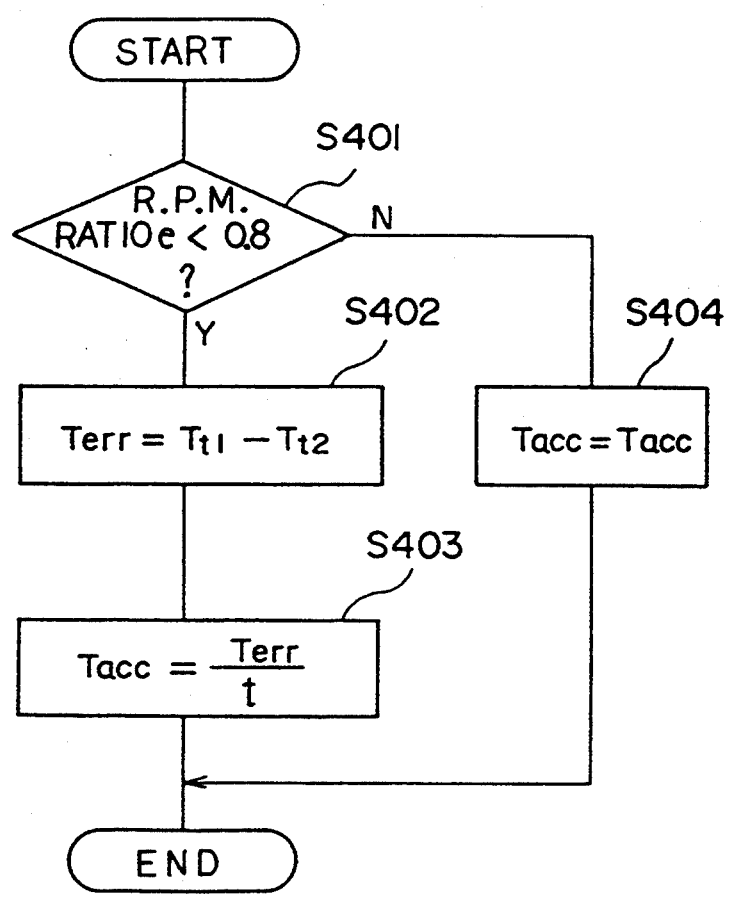
FIG. 13 is a flow chart showing steps for evaluating an accessory torque in an example.

As illustrated in the flow chart of FIG. 13, the accessory torque calculation part 55 decides whether or not the r.p.m. ratio e evaluated by the torque ratio/capacity coefficient calculation part 51 of the turbine torque calculation portion 50 is smaller than 0.8 (step 401). When the r.p.m. ratio e is smaller than 0.8, the routine proceeds to a step 402, and when not, the routine proceeds to a step 404. The step 402 obtains the difference between the turbine torque $T_{t1}$ evaluated using the engine output characteristics and the turbine torque $T_{t2}$ evaluated using the torque converter characteristics. Further, the next step 403 divides the resulting difference $T_{err}$ by the torque ratio t, thereby obtaining the accessory torque $T_{acc}$. On the other hand, in the case where the step 401 having decided the r.p.m. ratio e to be at least 0.8 is followed by the step 404, the accessory torque $T_{acc}$ evaluated in the last cycle of the accessory torque calculating operation is directly set.

Figure 14:
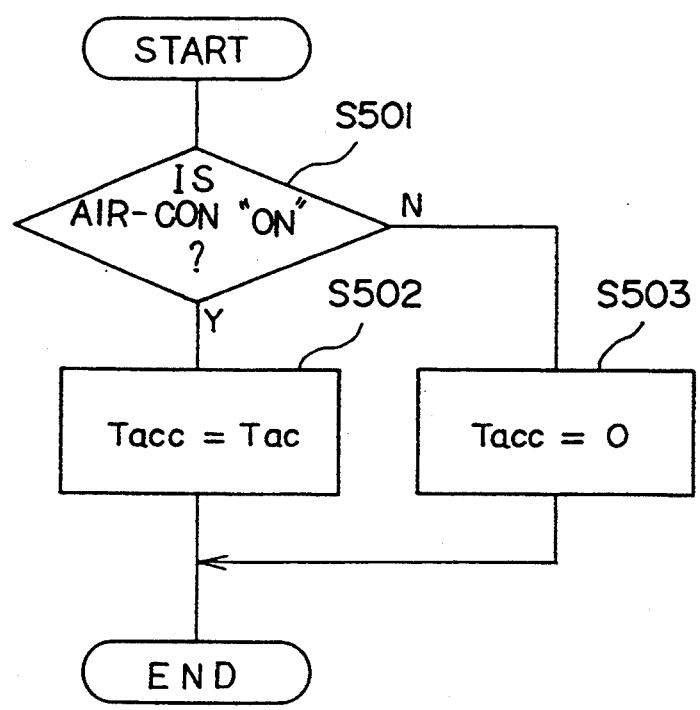
FIG. 14 is a flow chart showing steps for evaluating an accessory torque in another example.

Alternatively, the accessory torque $T_{acc}$ can be evaluated as illustrated in the flow chart of FIG. 14. More specifically, the driving torque of the accessory such as an air conditioner is evaluated beforehand, and the turbine torque calculation portion 50 is so constructed that the "ON" signal of the accessory is input to the accessory torque calculation part 55. Thus, the calculation part 55 decides whether or not the air conditioner is turned ON (step 501). When the air conditioner is ON, the accessory torque or air conditioner torque $T_{ac}$ previously obtained is invoked, and it is set as the accessory torque $T_{acc}$ (step 502), and when not, the accessory torque $T_{acc}$ is set to 0 (zero) (step 503).

The turbine torque selection part 58 of the turbine torque calculation portion 50 selects either of the turbine torque $T_{t1}$ evaluated using the engine output characteristics or the turbine torque $T_{t2}$ evaluated using the torque converter characteristics, in accordance with the r.p.m. ratio e evaluated by the torque ratio/capacity coefficient calculation part 51 of the turbine torque calculation portion 50.

In the case of evaluating the turbine torque $T_t$, it is basically more preferable to utilize the torque converter characteristics. As seen from FIG. 10, however, the capacity coefficient $\tau$ changes abruptly when the r.p.m. ratio e enlarges. Therefore, in a case where the r.p.m. ratio e is large to some extent, even the slight error of the r.p.m. ratio e incurs a very great error in the capacity coefficient $\tau$ to-be-obtained. Accordingly, in such a case where the engine torque $T_e$ is calculated using the capacity coefficient $\tau$ at the step 305 (shown in FIG. 12) and where it is used for calculating the turbine torque $T_{t2}$ at the step 306, the calculated turbine torque $T_{t2}$ cannot be guaranteed to be accurate enough for the large r.p.m. ratio e.

Therefore, when the r.p.m. ratio e is smaller than 0.8, the turbine torque selection part 58 selects the turbine torque $T_{t2}$ evaluated using the torque converter characteristics, whereas when the r.p.m. ratio e is at least 0.8, the selection part 58 selects the turbine torque $T_{t1}$ evaluated using the engine torque characteristics.

The turbine torque $T_t$ thus obtained is input to the gradient resistance torque calculation portion 60, and is used for the calculation of the gradient resistance torque $T_\theta$.

Figure 15:
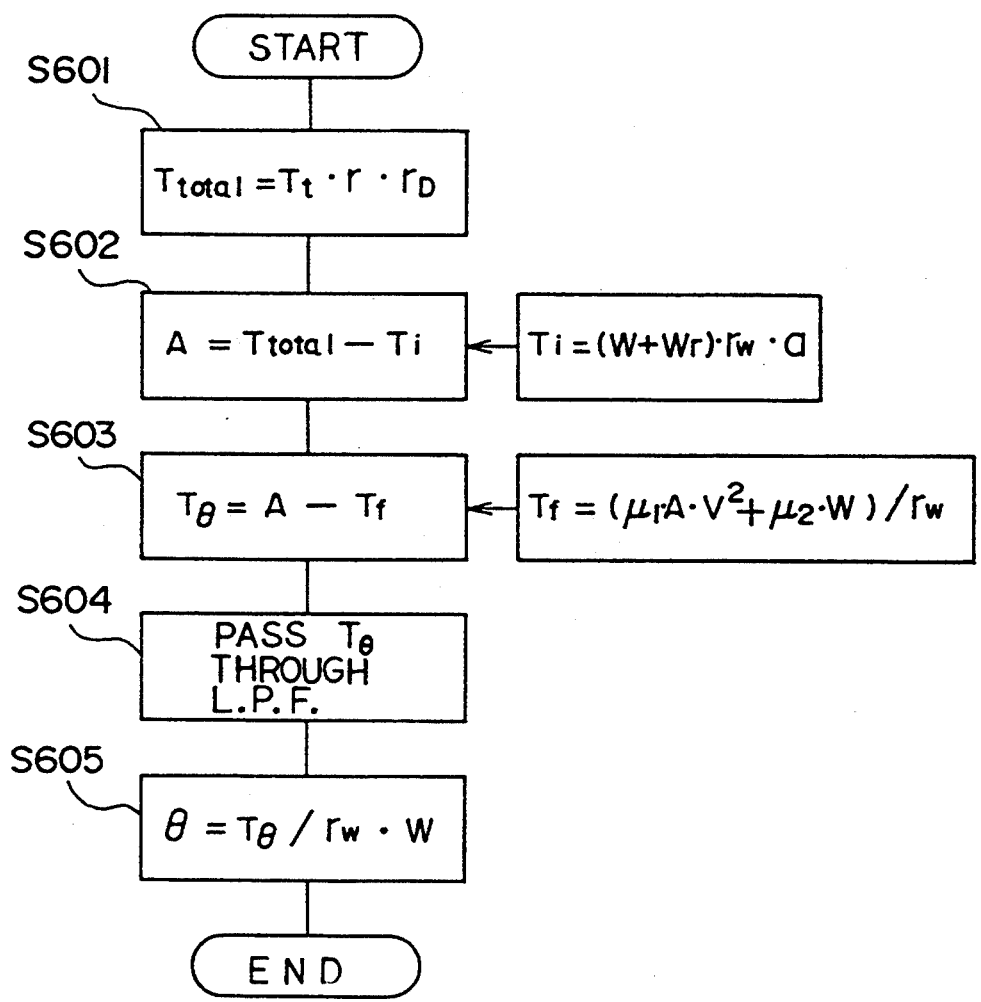
FIG. 15 is a flow chart showing steps for evaluating a gradient from a total torque in an example.

The operations of the gradient resistance torque calculation portion 60 and the gradient calculation portion 70 will be explained in conjunction with a flow chart shown in FIG. 15.

First, the combined resistance torque $T_{total}$ of the axle is evaluated by multiplying the turbine torque $T_t$ calculated by the turbine torque calculation portion 50 by the gear ratio r of the speed change gear and also by the gear ratio $r_D$ of the differential gear (step 601).

Subsequently, the accelerating resistance torque $T_i$ is subtracted from the combined resistance torque $T_{total}$ by the subtracter 64 (step 602).

Here, the accelerating resistance torque $T_i$ can be expressed as indicated by Eq. 4:

$$\begin{aligned} T_i &= F_i \cdot r_w \\ &= (W + W_r) \cdot a \cdot r_w \end{aligned} \qquad (Eq.\ 4)$$

where symbol $F_i$ denotes the force of the accelerating resistance, symbol $r_w$ the effective radius of each tyre, symbol W the overall weight of the automobile, symbol $W_r$ the weight of the rotating parts of the automobile, and symbol a the acceleration of the vehicle.

That is, the accelerating resistance torque $T_i$ is evaluated by the accelerating resistance torque calculation part 63 by multiplying the sum of the weight $W_r$ of the rotating parts and the estimated vehicle weight W obtained at the vehicle weight estimation means 22 by the effective tyre radius $r_W$ obtained beforehand, whereupon the resulting product is multiplied by the acceleration a detected by the acceleration sensor 11.

Subsequently, the gradient resistance torque $T_\theta$ is evaluated by the subtracter 65 by further subtracting the flatland running resistance torque $T_f$ is from the difference obtained by the subtraction of the accelerating resistance torque $T_i$ from the combined resistance torque $T_{total}$ (step 603). Here, the flatland running resistance torque $T_f$ (=the air resistance torque $T_a$+the rolling resistance torque $T_r$) can be expressed as indicated by Eq. (5):

$$T_f = (T_a + T_r)/r_W \quad (Eq. 5)$$
$$= (\mu_1 \cdot A \cdot V^2 + \mu_2 \cdot W)/r_W$$

where symbol $\mu_1$ denotes an air resistance coefficient, symbol A the projection area of the front of the vehicle, symbol V the vehicle speed, and symbol $\mu_2$ a rolling resistance coefficient. In the flatland running resistance torque calculation part 67 for evaluating the flatland running resistance torque $T_f$, values previously obtained are used as the air resistance coefficient $\mu_1$, front projection area A and effective tyre radius $r_W$, the value detected by the vehicle speed sensor 13 is used as the vehicle speed V, and the value calculated by the vehicle weight estimation means 22 is used as the vehicle weight W. In addition, the rolling resistance coefficient $\mu_2$ changes depending upon the condition of a road surface, the condition of the tyres, etc. Therefore, the relationships of the rolling resistance coefficient $\mu_2$ with the outputs of the various sensors are mapped beforehand, and the coefficient $\mu_2$ is obtained using the map.

Subsequently, the gradient resistance torque $T_\theta$ thus calculated has its fluctuating high-frequency component removed therefrom by the low-pass filter 66 (step 604).

Here, the gradient resistance $F_\theta$ can be expressed as indicated by Eq. 6:

$$F_\theta = W \cdot \sin\theta \quad (Eq. 6)$$

Therefore, the gradient $\theta$ can be given by Eq. 7:

$$\theta \div \sin\theta = F_\theta/W = T_\theta/(r_W \cdot W) \quad (Eq. 7)$$

Accordingly, the gradient $\theta$ is calculated by the divider 71 by dividing the gradient resistance torque $T_\theta$ by the effective tyre radius $r_W$ and the vehicle weight W (step 605).

Next, the operations of the standard lockup line selection means 21, the standard gear shift line selection means 24, the lockup line correction means 25, the gear shift line correction means 26, the lockup signal output means 27 and the shift signal output means 28 will be explained.

Figure 16:
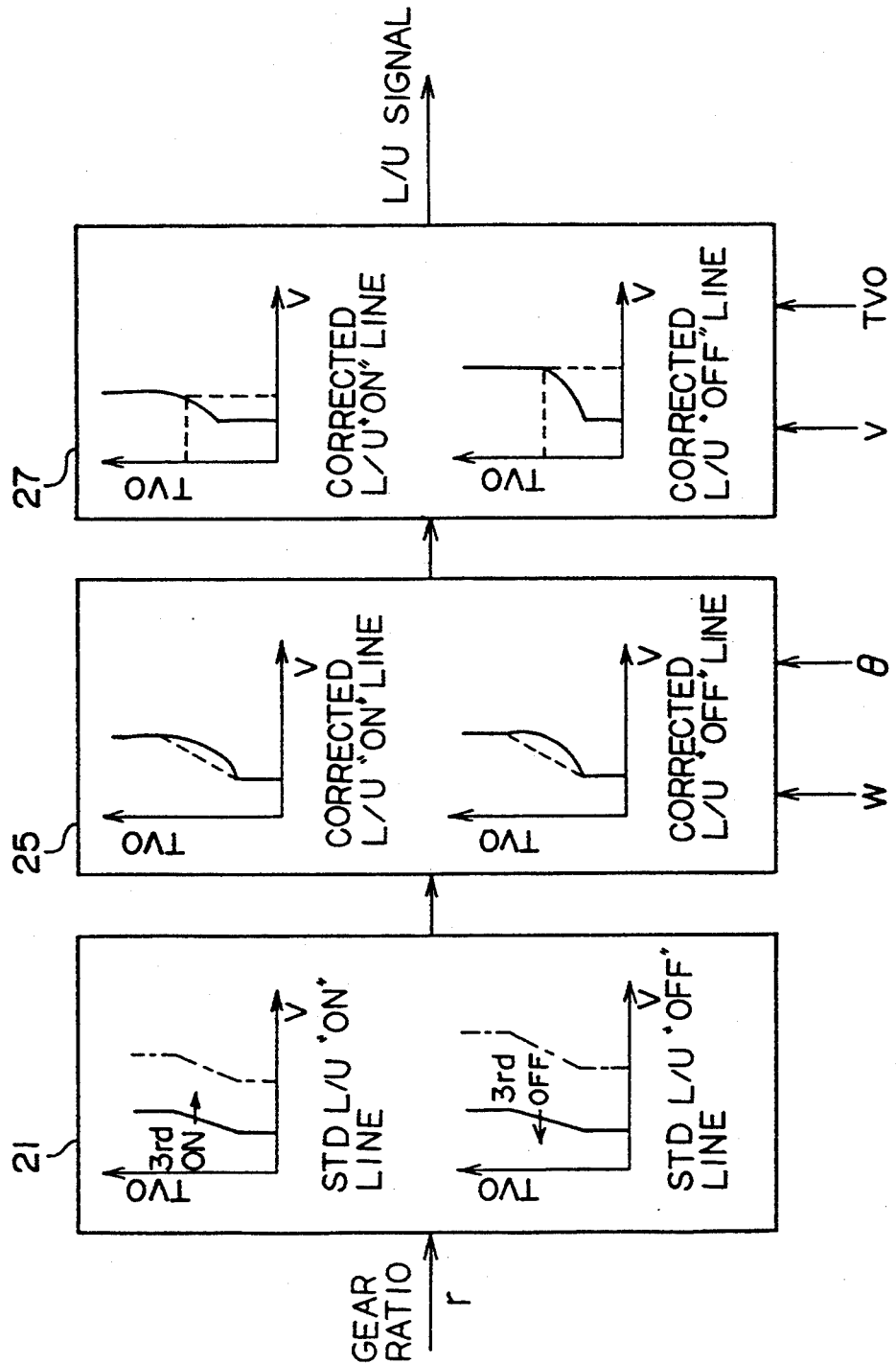
FIG. 16 is an explanatory diagram showing the operating contents of standard lockup line selection means, lockup line correction means and lockup signal output means which are included in the embodiment depicted in FIG. 1.

As illustrated in FIG. 16, a standard lockup ON map in which a plurality of standard lockup ON lines are developed, and a standard lockup OFF map in which a plurality of standard lockup OFF lines are developed are stored in the standard lockup line selection means 21 beforehand. The selection means 21 selects the standard lockup line corresponding to the change gear ratio r in the present state, from among the standard lockup lines of each map.

Figure 17:
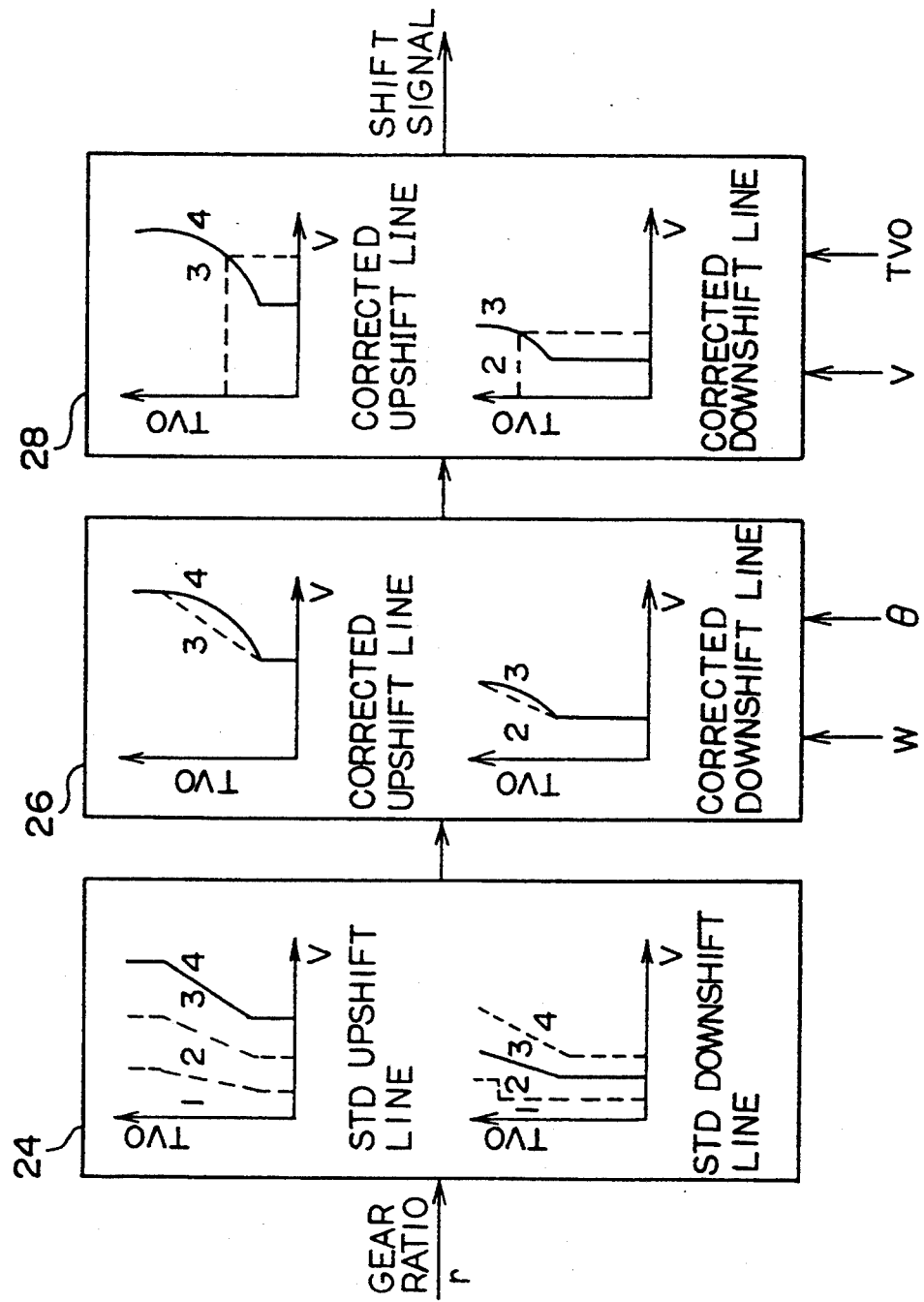
FIG. 17 is an explanatory diagram showing the operating contents of standard gear shift line selection means, gear shift line correction means and shift signal output means which are included in the embodiment.

Similarly to the above, as illustrated in FIG. 17, a standard upshift map in which a plurality of standard upshift lines are developed, and a standard downshift map in which a plurality of standard downshift lines are developed are stored in the standard gear shift line selection means 24 beforehand. The selection means 24 selects the standard gear shift line corresponding to the change gear ratio r in the present state, from among the standard gear shift lines of each map.

In the lockup line correction means 25, the selected standard lockup line is corrected by the use of the estimated vehicle weight W and gradient $\theta$ as shown in FIG. 16. Also in the gear shift line correction means 26, the selected standard gear shift line is corrected by the use of the estimated vehicle weight W and gradient $\theta$ as shown in FIG. 17.

The corrections will be concretely explained in detail with reference to FIGS. 18A and 18B.

Figure 18A:
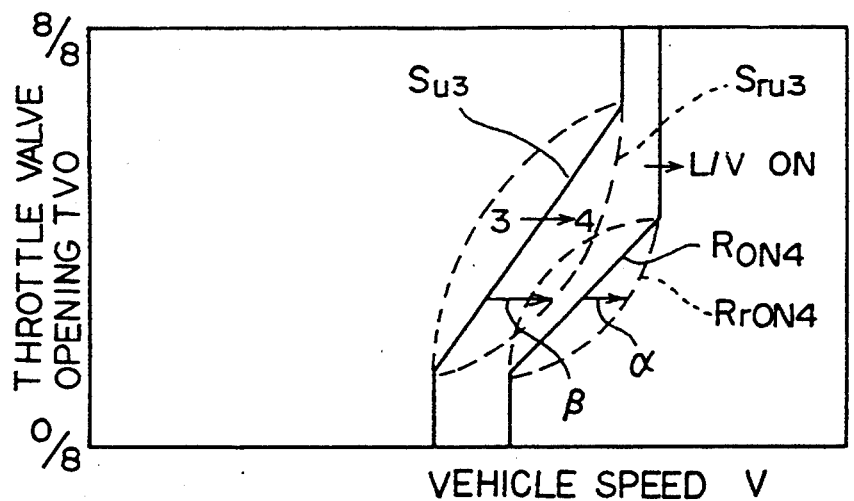
FIGS. 18A and 18B are graphs each serving to explain the correction contents of a standard lockup line and a standard gear shift line in an example.

By way of example, in a case where the change gear ratio r in the present state is "3", the standard lockup ON line $R_{ON4}$ of 4th speed and the standard upshift line $S_{u3}$ of 3rd speed→4th speed are respectively selected by the selection means 21 and 24 as shown in FIG. 18A. In the correction means 25 and 26, correction magnitudes $\alpha$ and $\beta$ indicated by Eqs. 8 and 9 are respectively added to the selected standard lines $R_{ON4}$ and $S_{u3}$ in order to make the corrections:

$$\alpha = (\alpha_\theta + \alpha_W) \cdot K_{1(TVO)} \quad (Eq. 8)$$

$$\beta = (\beta_\theta + \beta_W) \cdot K_{2(TVO)} \quad (Eq. 9)$$

Figure 19A:
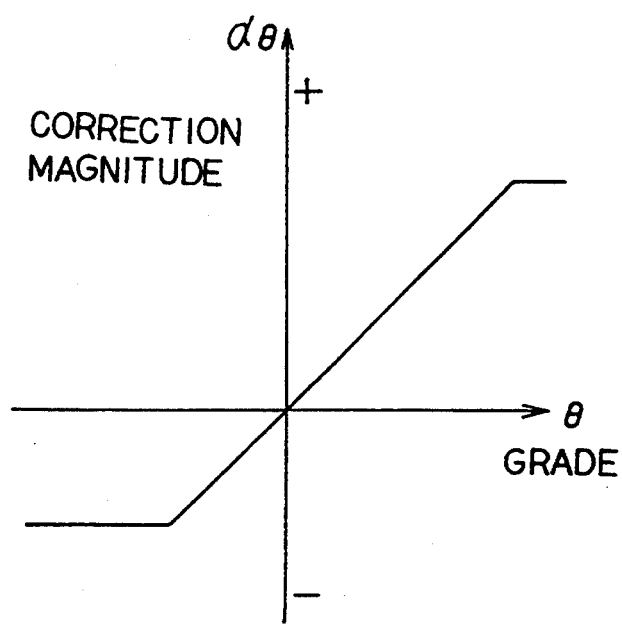
FIGS. 19A and 19B are graphs showing the relationships between a gradient ($\theta$) and respective correction magnitudes ($\alpha\theta$, $\beta\theta$) for the gradient in an example.
Figure 19B:
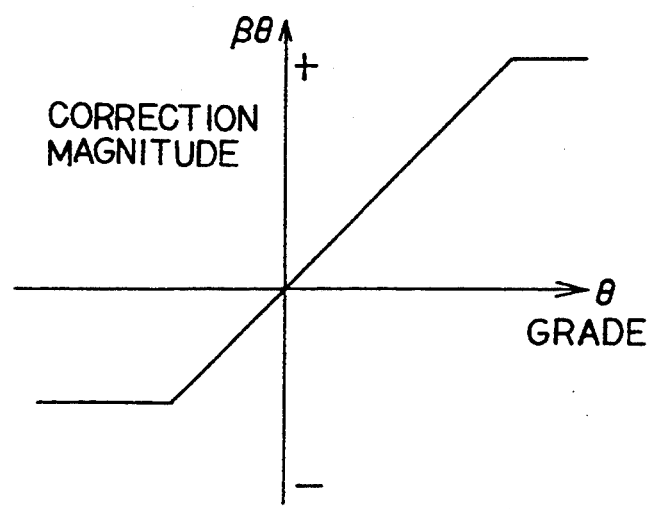
Figure 20A:
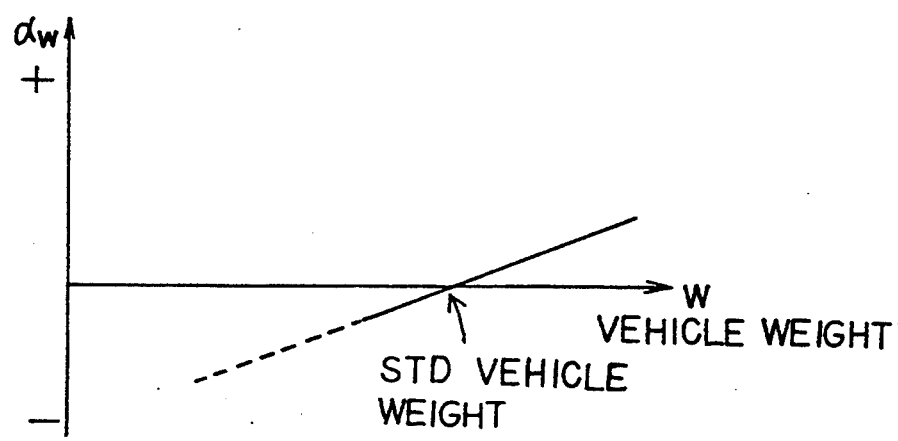
FIGS. 20A and 20B are graphs showing the relationships between a vehicle weight (W) and respective correction magnitudes ($\alpha_W$, $\beta_W$) for the vehicle weight in an example.
Figure 20B:
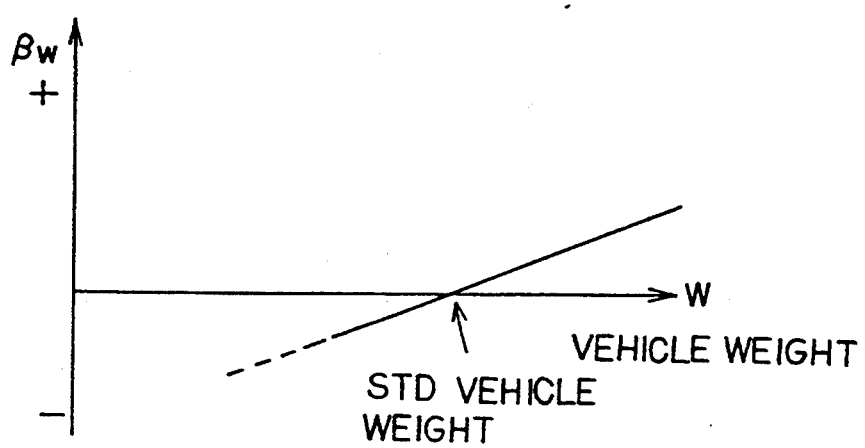
Figure 21:
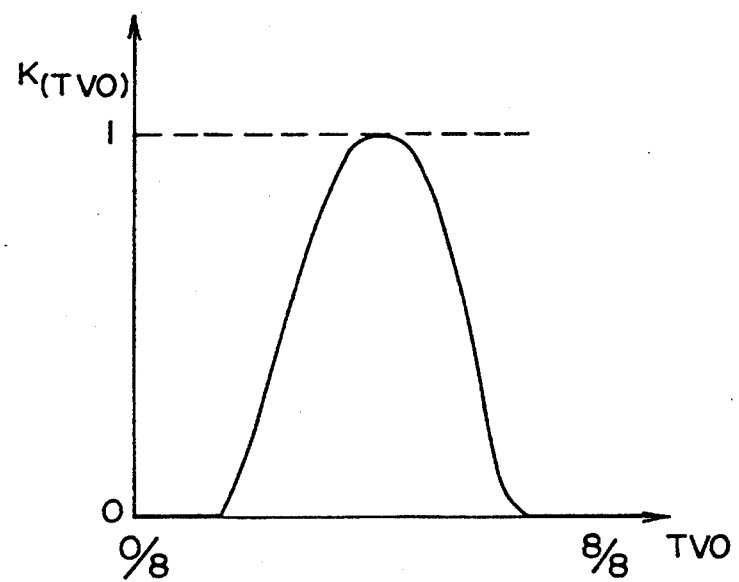
FIG. 21 is a graph showing the relationship between a throttle valve opening (TVO) and a correction coefficient ($K_{(TVO)}$) in an example.

Here in Eq. 8, symbol $\alpha_\theta$ denotes a correction magnitude for the gradient $\theta$, symbol $\alpha_W$ a correction magnitude for the vehicle weight W, and symbol $K_{1(TVO)}$ a coefficient which is set for every value of the throttle valve opening TVO. In Eq. 9, symbol $\beta_\theta$ denotes a correction magnitude for the gradient $\theta$, symbol $\beta_W$ a correction magnitude for the vehicle weight W, and symbol $K_{2(TVO)}$ a coefficient which is set for every value of the throttle valve opening TVO. Incidentally, regarding the correction magnitudes $\alpha_\theta$ and $\beta_\theta$, values which correspond to the gradient $\theta$ are respectively applied by utilizing functions previously stored as shown in FIGS. 19A and 19B. Likewise, regarding the correction magnitudes $\alpha_W$ and $\beta_W$, values which correspond to the estimated vehicle weight W are respectively applied by utilizing functions previously stored as shown in FIGS. 20A and 20B. As illustrated in FIG. 21, the coefficient $K_{(TVO)}$ is previously given as a function of the throttle valve opening TVO, and it has values of 0 (zero) thru 1 (one) inclusive.

Figure 18B:
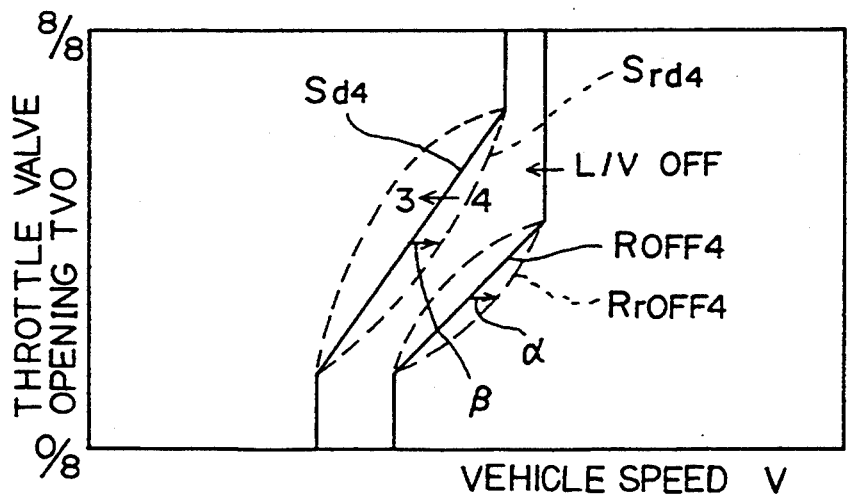

As another example, in a case where the change gear ratio r in the present state is "4", the standard lockup OFF line $R_{OFF4}$ of 4th speed and the standard downshift line $S_{d4}$ of 4th speed→3rd speed are respectively selected by the selection means 21 and 24 as shown in FIG. 18B. In the correction means 25 and 26, correction magnitudes $\alpha$ and $\beta$ indicated by Eqs. 10 and 11 are respectively added to the selected standard lines $R_{OFF4}$ and $S_{d4}$ in order to make the corrections:

$$\alpha = (\alpha_\theta + \alpha_W) \cdot K_{3(TVO)} \quad \text{(Eq. 10)}$$

$$\beta = (\beta_\theta + \beta_W) \cdot K_{4(TVO)} \quad \text{(Eq. 11)}$$

Here, symbols $K_{3(TVO)}$ and $K_{4(TVO)}$ denote coefficients which are set for every value of the throttle valve opening TVO, and which have the relationship shown in FIG. 21 versus the throttle valve opening TVO.

The lockup signal output means 27 is sequentially supplied with the throttle valve opening TVO and vehicle speed V from the throttle valve opening sensor 12 and vehicle speed sensor 13 respectively, as indicated in FIG. 16. When a point which is determined by the entering throttle valve opening TVO and vehicle speed V has been reached on the lockup line corrected as stated above, the lockup signal is delivered from the lockup signal output means 27 to the lockup solenoid 33 through the output interface 32. Then, the lockup ON or lockup OFF is effected.

Also, the shift signal output means 28 is sequentially supplied with the throttle valve opening TVO and vehicle speed V from the throttle valve opening sensor 12 and vehicle speed sensor 13 respectively, as indicated in FIG. 17. When a point which is determined by the entering throttle valve opening TVO and vehicle speed V has been reached on the gear shift line corrected as stated above, the shift signal is delivered from the shift signal output means 28 to the shift solenoid 34 through the output interface 32. Then, the alteration of the change gear ratio is effected.

As thus far described, this embodiment varies the lockup point and the gear shift point in accordance with the vehicle weight and the gradient which are factors exerting influence on the running resistance. It can therefore enhance the drivability in the case where the running resistance has changed.

Incidentally, this embodiment is provided with the standard lockup line selection means 21 and the standard gear shift line selection means 24, each of which selects only one standard line to-be-corrected so as to correct the selected standard line by the corresponding correction means 25 or 26. It is also allowed, however, to correct all the standard lines without providing the selection means.

In addition, although this embodiment varies the lockup point and the gear shift point in accordance with the vehicle weight and the gradient which are the influential factors of the running resistance, one or more of the combined torque, the gradient resistance torque, the rolling resistance torque, the air resistance torque, etc. may well be grasped and then used for varying the lockup point and the gear shift point.

Besides, although this embodiment consists in the automatic transmission control system for the speed change gear of multiple gear shift stages, the present invention is not restricted thereto, but it may well be applied to a speed change gear of stepless type.

According to the present invention, the timing of lockup ON or lockup OFF is varied in accordance with the running resistance of a vehicle, so that the drivability of the vehicle can be enhanced in the case of changes in the running resistance.

What is claimed is:

1. An automatic transmission control system for a transmission which has a speed change gear, a torque converter, and a lockup mechanism for the torque converter; comprising:

running resistance grasp means for grasping either of a running resistance or a value of at least one factor which exerts influence on the running resistance;

standard lockup line memory means for storing therein a single lockup line which corresponds to a condition when the running resistance is standard;

lockup line correction means for correcting the single lockup line in accordance with either of said running resistance or said value of the influential factor as grasped by said running resistance grasp means; and lockup signal output means for deciding a timing of either lockup "ON" or lockup "OFF" in accordance with the lockup line corrected by said lockup line correction means, and for delivering a lockup signal to said lockup mechanism so as to drive it at the decided timing.

2. An automatic transmission control system as defined in claim 1, wherein:

said speed change gear is a speed change gear of multiple gear shift stages, so that said standard lockup line memory means stores therein a plurality of lockup lines which correspond respectively to the specified gear shift stages;

standard lockup line selection means is further comprised for selecting one lockup line corresponding to the gear shift stage in a present state, from among the plurality of lockup lines stored in said standard lockup line memory means; and said lockup line correction means corrects the lockup line selected by said standard lockup line selection means.

3. An automatic transmission control system as defined in claim 2, further comprising:

input load detection means for detecting either of a quantity of fuel injection or a magnitude which has a predetermined relation with the quantity of fuel injection, and vehicle speed detection means for detecting a speed of a vehicle in which said transmission is installed;

the plurality of stored lockup lines of said standard lockup line memory means being set under a condition that the vehicle speed and either of said quantity of fuel injection or said magnitude relating therewith are used as parameters;

said lockup signal output means delivering the lockup signal upon deciding that a time at which the detected vehicle speed and the detected one of the quantity of fuel injection and the magnitude relating therewith have reached a point on the selected and corrected lockup line is the timing of either of said lockup "ON" or said lockup "OFF".

4. An automatic transmission control system as defined in claim 1, further comprising:

input load detection means for detecting either of a quantity of fuel injection or a magnitude which has a predetermined relation with the quantity of fuel injection, and vehicle speed detection means for detecting a speed of a vehicle in which said transmission is installed;

the stored lockup line of said standard lockup line memory means being set under a condition that the vehicle speed and either of said quantity of fuel injection or said magnitude relating therewith are used as parameters;

said lockup signal output means delivering the lockup signal upon deciding that a time at which the detected vehicle speed and the detected one of the quantity of fuel injection and the magnitude relating therewith have reached a point on the corrected lockup line is the timing of either of said lockup "ON" or said lockup "OFF".

5. An automatic transmission control system as defined in claim 1, wherein:
the factor which exerts influence on the running resistance is a weight of a vehicle in which said transmission is installed; and
said running resistance grasp means includes vehicle weight grasp means for grasping the vehicle weight.

6. An automatic transmission control system as defined in claim 1, wherein:
the factor which exerts influence on the running resistance is a gradient on which a vehicle having said transmission installed therein is running; and
said running resistance grasp means includes grade grasp means for grasping the grade.

7. An automatic transmission control system as defined in claim 1, wherein:
the factors which exert influence on the running resistance are a weight of a vehicle in which said transmission is installed, and a gradient on which said vehicle is running; and
said running resistance grasp means includes vehicle weight grasp means for grasping the vehicle weight, and gradient grasp means for grasping the gradient.

8. An automatic transmission control system for a transmission which has a speed change gear, a torque converter, and a lockup mechanism for the torque converter; comprising:
running resistance grasp means for grasping either of a running resistance or a value of at least one factor which exerts influence on the running resistance;
standard lockup line memory means for storing therein a single lockup line which corresponds to a condition when the running resistance is standard;
standard gear shift line memory means for storing therein a gear shift line which corresponds to the condition when the running resistance is standard;
lockup line correction means for correcting the single lockup line in accordance with either of said running resistance or said the value of the influential factor as grasped by said running resistance grasp means;
gear shift line correction means for correcting the gear shift line in accordance with either of said running resistance or said value of the influential factor as grasped by said running resistance grasp means;
lockup signal output means for deciding a timing of either lockup "ON" or lockup "OFF" in accordance with the lockup line corrected by said lockup line correction means, and for delivering a lockup signal to said lockup mechanism so as to drive it at the decided timing; and
shift signal output means for deciding a timing of alteration of a gear shift ratio of said speed change gear in accordance with the gear shift line corrected by said gear shift line correction means, and for delivering a shift signal to said speed change gear so as to drive it at the decided timing.

9. An automatic transmission control system as defined in claim 8, wherein:
said speed change gear is a speed change gear of multiple gear shift stages, so that said standard lockup line memory means stores therein a plurality of lockup lines which correspond respectively to the specified gear shift stages, while said standard gear shift line memory means stores therein a plurality of gear shift lines which correspond respectively to said gear shift stages;
standard lockup line selection means is further comprised for selecting one lockup line corresponding to the gear shift stage in a present state, from among the plurality of lockup lines stored in said standard lockup line memory means;
standard gear shift line selection means is further comprised for selecting one gear shift line corresponding to the gear shift stage in the present state, from among the plurality of gear shift lines stored in said standard gear shift line memory means;
said lockup line correction means corrects the lockup line selected by said standard lockup line selection means; and
said gear shift line correction means corrects the gear shift line selected by said standard gear shift line selection means.

10. An automatic transmission control system as defined in claim 9, further comprising:
input load detection means for detecting either of a quantity of fuel injection or a magnitude which has a predetermined relation with the quantity of fuel injection, and vehicle speed detection means for detecting a speed of a vehicle in which said transmission is installed;
the plurality of stored lockup lines of said standard lockup line memory means being set under a condition that the vehicle speed and either of said quantity of fuel injection or said magnitude relating therewith are used as parameters;
the plurality of stored gear shift lines of said standard gear shift line memory means being set under the condition that the vehicle speed and either of said quantity of fuel injection or said magnitude relating therewith are used as parameters;
said lockup signal output means delivering the lockup signal upon deciding that a time at which the detected vehicle speed and the detected one of the quantity of fuel injection and the magnitude relating therewith have reached a point on the selected and corrected lockup line is the timing of either of said lockup "ON" or said lockup "OFF";
said shift signal output means delivering the shift signal upon deciding that a time at which the detected vehicle speed and the detected one of the quantity of fuel injection and the magnitude relating therewith have reached a point on the selected and corrected gear shift line is the timing of the alteration of the gear shift ratio.

11. An automatic transmission control system as defined in claim 8, further comprising:
input load detection means for detecting either of a quantity of fuel injection or a magnitude which has a predetermined relation with the quantity of fuel injection, and vehicle speed detection means for detecting a speed of a vehicle in which said transmission is installed;
the stored lockup line of said standard lockup line memory means being set under a condition that the vehicle speed and either of said quantity of fuel injection or said magnitude relating therewith are used as parameters;

the stored gear shift line of said standard gear shift line memory means being set under the condition that the vehicle speed and either of said quantity of fuel injection or said magnitude relating therewith are used as parameters;

said lockup signal output means delivering the lockup signal upon deciding that a time at which the detected vehicle speed and the detected one of the quantity of fuel injection and the magnitude relating therewith have reached a point on the corrected lockup line is the timing of either of said lockup "ON" or said lockup "OFF";

said shift signal output means delivering the shift signal upon deciding that a time at which the detected vehicle speed and the detected one of the quantity of fuel injection and the magnitude relating therewith have reached a point on the corrected gear shift line is the timing of the alteration of the gear shift ratio.

12. An automatic transmission control system as defined in claim 8, wherein:

the factor which exerts influence on the running resistance is a weight of a vehicle in which said transmission is installed; and said running resistance grasp means includes vehicle weight grasp means for grasping the vehicle weight.

13. An automatic transmission control system as defined in claim 8, wherein:

the factor which exerts influence on the running resistance is a gradient on which a vehicle having said transmission installed therein is running; and said running resistance grasp means includes gradient grasp means for grasping the gradient.

14. An automatic transmission control system as defined in claim 8, wherein:

the factors which exert influence on the running resistance are a weight of a vehicle in which said transmission is installed, and a gradient on which said vehicle is running; and said running resistance grasp means includes vehicle weight grasp means for grasping the vehicle weight, and gradient grasp means for grasping the gradient.

* * * * *